US012598062B2

(12) United States Patent
Tong et al.

(10) Patent No.: US 12,598,062 B2
(45) Date of Patent: Apr. 7, 2026

(54) METHODS AND SYSTEMS FOR A 2-QUBIT MULTI-USER QUANTUM KEY DISTRIBUTION PROTOCOL

(71) Applicant: HUAWEI TECHNOLOGIES CANADA CO., LTD., Kanata (CA)

(72) Inventors: Wen Tong, Ottawa (CA); Sheng Sun, Kanata (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 123 days.

(21) Appl. No.: 18/521,368

(22) Filed: Nov. 28, 2023

(65) Prior Publication Data

US 2024/0214191 A1 Jun. 27, 2024

Related U.S. Application Data

(63) Continuation of application No. PCT/CA2021/050738, filed on May 31, 2021.

(51) Int. Cl.
H04L 9/08 (2006.01)

(52) U.S. Cl.
CPC .......... H04L 9/0852 (2013.01); H04L 9/0819 (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/0869;
(Continued)

(56) References Cited

U.S. PATENT DOCUMENTS 5,764,765 A * 6/1998 Phoenix ................ H04L 9/0858
                                                      380/256
6,748,083 B2 * 6/2004 Hughes ................. H04L 9/0858
                                                      380/278
(Continued)

FOREIGN PATENT DOCUMENTS

JP      2007074302 A    3/2007
JP      2007143085 A    6/2007
JP      2016072666 A    5/2016

OTHER PUBLICATIONS

"Comparison of Four Multi-User Quantum Key Distribution Schemes Over Passive Optical Networks", Patrick D. Kumavor, et al., Journal of Lightwave Technology, vol. 23, No. 1, Jan. 2005.
(Continued)

*Primary Examiner* — Sharif E Ullah

(57) ABSTRACT

A method of quantum key distribution making use of 2-qubit entanglement, by which one entangled qubit is sent from an operator O to Alice and the other entangled qubit is sent from operator O to Bob, making for key-sharing among three parties (multi-user quantum key distribution, i.e. MU QKD). Alice and Bob each measures a respective sequence of qubits randomly along either one of two states, records the measurements in a respective list, and encodes the bits in an encoded list. The encoded lists are sent to operator O for entanglement to be verified with the CHSH inequality. Bob's verified list is sent to Alice and vice-versa, allowing Alice and Bob to further verify correlation. Non-entangled bits are rejected until Alice and Bob have a similar key, being a reconciled quantum-based key as sought.

12 Claims, 11 Drawing Sheets

(58) Field of Classification Search

CPC ........... H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

USPC ........ 380/278, 255, 264, 276; 726/2, 21, 36; 713/150, 163, 181

See application file for complete search history.

(56) References Cited

U.S. PATENT DOCUMENTS

| | | | | |
|---|---|---|---|---|
| 7,437,081 | B2 * | 10/2008 | Mitchell | H04B 10/70 |
| | | | | 398/154 |
| 8,855,316 | B2 * | 10/2014 | Wiseman | H04L 9/0855 |
| | | | | 380/278 |
| 9,350,461 | B1 * | 5/2016 | Smith | H04B 10/90 |
| 9,413,470 | B1 * | 8/2016 | Smith | H04B 10/70 |
| 9,960,465 | B2 * | 5/2018 | Dudley | H01M 50/204 |
| 10,057,058 | B2 * | 8/2018 | Murakami | H04L 9/0858 |
| 2005/0138352 | A1 * | 6/2005 | Gauvreau | H04L 9/3247 |
| | | | | 713/153 |
| 2005/0221759 | A1 * | 10/2005 | Spadafora | G08G 1/093 |
| | | | | 455/39 |
| 2007/0065154 | A1 * | 3/2007 | Luo | H04J 14/0246 |
| | | | | 398/141 |
| 2007/0076884 | A1 * | 4/2007 | Wellbrock | H04L 9/0855 |
| | | | | 380/263 |
| 2007/0195774 | A1 * | 8/2007 | Sherman | H04L 69/16 |
| | | | | 370/392 |
| 2011/0206204 | A1 * | 8/2011 | Sychev | H04J 14/06 |
| | | | | 380/256 |
| 2011/0213979 | A1 * | 9/2011 | Wiseman | H04L 9/0844 |
| | | | | 713/171 |
| 2011/0243331 | A1 * | 10/2011 | Yasuda | H04L 9/0836 |
| | | | | 380/46 |
| 2012/0045208 | A1 * | 2/2012 | Yasuda | H04B 10/60 |
| | | | | 398/65 |
| 2012/0050834 | A1 * | 3/2012 | Harrison | H04B 10/70 |
| | | | | 359/107 |
| 2012/0082464 | A1 * | 4/2012 | Yasuda | H04B 10/6166 |
| | | | | 398/152 |
| 2012/0237202 | A1 * | 9/2012 | Abe | H04B 10/6164 |
| | | | | 398/16 |
| 2013/0051790 | A1 * | 2/2013 | Yasuda | H04B 10/6151 |
| | | | | 398/16 |
| 2013/0266308 | A1 * | 10/2013 | Fukuchi | H04B 10/616 |
| | | | | 398/16 |
| 2014/0010234 | A1 * | 1/2014 | Patel | H04L 45/74 |
| | | | | 370/392 |
| 2014/0068765 | A1 * | 3/2014 | Choi | H04L 63/1416 |
| | | | | 726/23 |
| 2014/0133652 | A1 * | 5/2014 | Oshida | H04L 9/0897 |
| | | | | 380/255 |
| 2014/0286638 | A1 * | 9/2014 | Yasuda | H04J 14/06 |
| | | | | 398/65 |
| 2015/0372765 | A1 * | 12/2015 | Yasuda | H04B 10/613 |
| | | | | 398/29 |
| 2016/0036554 | A1 * | 2/2016 | Yasuda | H04J 14/06 |
| | | | | 398/65 |
| 2016/0050025 | A1 * | 2/2016 | Yasuda | H04B 10/6165 |
| | | | | 398/65 |
| 2016/0155327 | A1 * | 6/2016 | Schlienz | G08G 1/096791 |
| | | | | 340/907 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2017/0338895 | A1 * | 11/2017 | Yasuda | H04B 10/6971 |
| 2017/0338952 | A1 * | 11/2017 | Hong | H04L 9/083 |
| 2018/0069698 | A1 * | 3/2018 | Hong | H04L 9/083 |
| 2018/0176091 | A1 * | 6/2018 | Yoon | H04L 5/1446 |
| 2018/0248582 | A1 * | 8/2018 | Yasuda | H04J 11/00 |
| 2019/0036821 | A1 * | 1/2019 | Levy | G06F 12/0868 |
| 2019/0115983 | A1 * | 4/2019 | Yasuda | H04B 10/612 |
| 2019/0260581 | A1 * | 8/2019 | Su | H04L 9/08 |
| 2019/0349392 | A1 * | 11/2019 | Wetterwald | H04L 43/0852 |
| 2020/0084222 | A1 * | 3/2020 | William | H04L 63/12 |
| 2020/0145115 | A1 * | 5/2020 | Kirby | H04L 5/04 |
| 2022/0360434 | A1 * | 11/2022 | Choi | H04L 63/061 |
| 2023/0216671 | A1 * | 7/2023 | Chen | H04L 9/0855 |
| | | | | 380/256 |
| 2024/0204999 | A1 * | 6/2024 | Tong | H04L 9/0861 |
| 2024/0283638 | A1 * | 8/2024 | Yasuda | H04L 9/085 |
| 2025/0068957 | A1 * | 2/2025 | Kim | G06N 10/40 |
| 2025/0119281 | A1 * | 4/2025 | Wong | H04L 9/0827 |
| 2025/0141671 | A1 * | 5/2025 | Kawakami | H04L 9/0819 |

OTHER PUBLICATIONS

"Efficient multiuser quantum cryptography network based on entanglement", Peng Xue, et al., Scientific Reports, 2017.

"Proposed Experiment to Test Local Hidden-Variable Theories", John F. Clauser, et al., Phyical Review Letters, vol. 23, No. 15, Oct. 13, 1969.

"On the Einstein Podolsky Rosen Paradox", J. S. Bell, Department of Physics, University of Wisconsin, Nov. 4, 1964.

"Quantum cryptography: Public key distribution and coin tossing", C. H. Bennett and G. Brassard, International Conference on Computers, Systems and Signal Processing, vol. 1, Dec. 9-12, 1984.

Takei Hiroki, "Using optical fiber to generate entangled photon pairs in optical communication wavelength band", Institute of Applied Physics, No. 75, No. 11, Nov. 10, 2006, (abstract only).

Kumar Ajay et al:"State-of-the-Art Survey of Quantum Cryptography",Archives of Computational Methods in Engineering,Springer Netherlands.Dordrecht, vol. 28, No. 5, Apr. 19, 2021.

Ekert A K:"Quantum Cryptography Based on Bell's Theorem",Physical Review Letters,American Physical Society,US, vol. 67, No. 6, Aug. 5, 1991.

Alexander Ling et al.:"Experimental E91 quantum key distribution", SPIE,PO Box 10 Bellingham WA 98227-0010 USA, Jan. 1, 2008.

Michal Hajdu\V{S}Ek et al:"Quantum Communications", arxiv. org,Cornell University Library,201 Olin Library Cornell University Ithaca,NY 14853, Nov. 4, 2023.

* cited by examiner

1

METHODS AND SYSTEMS FOR A 2-QUBIT MULTI-USER QUANTUM KEY DISTRIBUTION PROTOCOL

RELATED APPLICATIONS

The present application is a continuation of International Application No. PCT/CA2021/050738 filed May 31, 2021 and entitled "METHODS AND SYSTEMS FOR A 2-QU-BIT MULTI-USER QUANTUM KEY DISTRIBUTION PROTOCOL", the contents of which are incorporated herein in their entirety.

FIELD OF THE INVENTION

This invention pertains generally to the field of quantum cryptography and in particular, to methods and systems for a quantum key distribution between 3 parties, using 2 entangled qubits.

BACKGROUND

It is generally believed that quantum objects can be utilized to provide communication security that is much improved over conventional, non-quantum methods. While the BB84 protocol (Bennet, Brassard, Quantum cryptography: Public key distribution and coin tossing, Proceedings of IEEE International Conference on Computers, Systems and Signal Processing, volume 175, page 8. New York, 1984) is a provable authentication protocol that can allow key distribution from one sending party to one receiving party, it is limited to two-party authentication and is not well suited for key distribution to multiple parties. Prior art methods for enabling quantum-based security between multiple users of communication equipment has, without loss of generality, been particularly focused on two fronts.

On a first front, the prior art has examined some methods of utilizing photonic devices to generate multiple entangled particles, for multiple users. In Kumavor et al. (Comparison of Four Multi-User Quantum Key Distribution Schemes Over Passive Optical Networks, Journal of Lightwave Technology, Vol. 23, No. 1, January 2005), the authors provide some survey information on recent quantum key distribution (QKD) protocol developments, as well as performance comparisons. The schemes considered in that paper consider entanglement scenarios for 2 parties, the sending party traditionally referred to as "Alice", and the receiving party as "Bob".

On a second front, prior art has addressed methods to generalize the BB84 protocol. These methods aim at supporting QKD for multiple users. Recent prior art on this front can be represented in a paper by Xue et al. (Efficient multiuser quantum cryptography network based on entanglement, Nature. Sci Rep 7, 45928, 2017). This paper considers a QKD scheme for multiple users, based on 3 entangled bits or more, systems that are difficult to implement physically.

On the first front, only two parties are considered, while on the second front, systems generally rely on systems with 3 entangled qubits, which are difficult to implement in practice.

On either front, the prior art lacks a practical approach to implement secured quantum entanglement-based communication links between 3 parties, using one pair of qubits. Methods and systems are therefore required to obviate or mitigate one or more limitations of the prior art, by facilitating quantum entanglement-based communication links between 3 parties, and considerably improving communication security between 3 parties.

This background information is provided to reveal information believed by the applicant to be of possible relevance to the present invention. No admission is necessarily intended, nor should be construed, that any of the preceding information constitutes prior art against the present invention.

SUMMARY

In the present invention, quantum entanglement is used to enable quantum key distribution among three parties. Embodiments include a multi-user ($N \geq 2$)-based quantum key distribution system in which the underlying security scheme is based on quantum entanglement and the Bell inequality violation, which are proved to provide the non-malleable and eavesdropping-proof security properties that are sought.

An aspect of the disclosure provides a method for an operator O to generate and distribute a multi-user shared key to multiple devices, for example, a receiver A and to a receiver B). The key is shared among Operator O and receiver A and receiver B. Such a method includes preparing pairs of entangled qubits in sequence, in which each pair of entangled qubits is in a state of 2-qubit entanglement. Such a method further includes sending, from each pair of entangled qubits, one entangled qubit to a receiver A, and the other entangled qubit to a receiver B. Such a method further includes receiving a reply from each of receiver A and receiver B: and sending the key to each of receiver A and receiver B.

In some embodiments, a reply from each of receiver A and receiver B includes receiving a list of encoded bits from receiver A and receiving a list of encoded bits from receiver B. For the list of encoded bits from receiver A, each bit having been: measured from a qubit sent by operator O, recorded in a list of recorded bits, and encoded in the list of encoded bits from receiver A. For the list of encoded bits from receiver B, each bit having been: measured from a qubit sent by operator O, recorded in a list of bits, and encoded in the list of encoded bits from receiver B.

In some embodiments, sending the key to each of receiver A and receiver B includes verifying the correlation between: the list of encoded bits from receiver A, and the list of encoded bits from receiver B. In such a method, verifying the correlation is performed using a quantum entanglement inequality. In some embodiments, the quantum entanglement inequality is the Clauser, Horne, Shimony, Holt (CHSH) inequality.

In some embodiments, sending the key to each of receiver A and receiver B includes sending to receiver A, the list of encoded bits from receiver B, for deriving a key according to receiver A's list of measured bits, and
receiver A's list of encoded bits.

Such embodiments further includes sending to receiver B, the list of encoded bits from receiver A for deriving a key according to receiver B's receiver B's list of measured bits, and
receiver B's list of encoded bits.

Such a method further includes receiving, through respective authenticated classical channels receiver A's derived key and receiver B's derived key. Such a method further includes performing quantum correlation between receiver A's derived key and receiver B's derived key using an entanglement inequality. In such embodiments, deriving a key comprises rejecting pairs of bits that were not entangled according to the entanglement inequality.

In some embodiments, the method further includes using a derived key as a reconciled key, if entanglement between receiver A's derived key and receiver B's is sufficient to ensure security.

In some embodiments, the method further includes discarding a derived key and aborting communication, if entanglement between receiver A's derived key and receiver B's is insufficient to ensure security.

In some embodiments, the method further includes a layer 2 iteration wherein operator O of claim 1 is substituted by receiver A of claim 1, receiver A of claim 1 is substituted by a USER-1, receiver B of claim 1 is substituted by a USER-2. In some embodiments, the method further includes a layer 2 iteration wherein operator O of claim 1 is substituted by receiver B of claim 1, receiver A of claim 1 is substituted by a USER-3, receiver B of claim 1 is substituted by a USER-4.

Further aspects of the disclosure are directed to a device, including a processor, and non-transient machine readable memory which executed by the processor, for implementing the method described above. Such a device may be operated by operator O.

Further aspects of the disclosure are directed to a receiver A device, including a processor, and non-transient machine readable memory which executed by the processor, for implementing the method described above. Similarly, further aspects of the disclosure are directed to a receiver B device, including a processor, and non-transient machine readable memory which executed by the processor, for implementing the method described above.

Further aspects of the disclosure are directed to a system, including an operator O device, receiver A and receiver B, with each device including a processor, and non-transient machine readable memory which executed by the processor, for implementing the method described above.

A further aspect of the disclosure provides a system for distributing a key. Such a system includes a photon source operative to send a sequence of photons, and a first beam splitting device. The first beam splitting device, is configured to prepare, from the sequence of photons, pairs of entangled qubits in sequence, with each pair of entangled qubits in a state of 2-qubit entanglement. The first beam splitting device, is further configured to send, from each entangled pair of qubits, one entangled qubit to a second beam splitting device, and the other entangled qubit to a third beam splitting device. In such a system, the second and third splitting devices are configured to measure a qubit as a bit, to record a bit in a list of measured bits, to encode a bit in a list of encoded bits, and to send a list of encoded bits to the first beam splitting device. In such a system the first beam splitting device is operative to receive lists of encoded bits, and calculate correlation between the lists of encoded bits using an entanglement inequality.

BRIEF DESCRIPTION OF THE DRAWINGS

Further features and advantages of the present invention will become apparent from the following detailed description, taken in combination with the appended drawings, in which.

DETAILED DESCRIPTION

As opposed to a bit of information, which can be in either of two states labeled as 0 and 1, and be implemented as a transistor being either off or on, a quantum bit, typically shortened to "qubit", can be in either of two states labeled as 0 and 1, conventionally labelled $|0\rangle$ (ket zero) and $|1\rangle$ (ket one), or in a superposition of states $|0\rangle$ and $|1\rangle$, which can be represented as:

$$|\psi\rangle = \alpha|0\rangle + \beta|1\rangle$$

where:
$|\Psi\rangle$ represents the state of interest,
$|0\rangle$ is identified as a computational basis state,
$|1\rangle$ is identified as another computational basis state,
$\alpha$ is a complex number, and
$\beta$ is another complex number.

A qubit cannot be implemented with a conventional transistor, but many other physical systems can be designed to realize a qubit. One implementation of a qubit is a single photon, which is light of such low intensity that it cannot be dimmed any further without being absolutely off. Other physical systems can be used, including atoms, ions, nuclei, specially designed electronic circuits and others.

An embodiment is not restricted to any specific implementation but in any case, the state of a qubit can be represented by referring to a computational basis, which can be made of two computational basis states: computational basis state $|0\rangle$ and computational basis state $|1\rangle$. In an embodiment, there can be two computational bases, each having two computational basis states. A first computational basis can have as computational basis states $|0\rangle$ and $|1\rangle$, and a second computational basis can have as computational basis states $|/\rangle$ (ket slash) and $|\backslash\rangle$ (ket backslash). In a graphical representation, computational basis states $|/\rangle$ and $|\backslash\rangle$ can be tilted at 45° from the computational basis states $|0\rangle$ and $|1\rangle$ of the first computational basis. The computational basis having states $|0\rangle$ and $|1\rangle$ can be referred to as the xz basis, and its states $|0\rangle$ and $|1\rangle$ can be said to be along the x-axis and the z-axis respectively. As for the computational basis having states $|/\rangle$ and $|\backslash\rangle$, it can be referred to as the vw-basis and its states $|/\rangle$ and $|\wedge\rangle$ can be said to be along the v-axis and the w-axis respectively.

Figure 1:
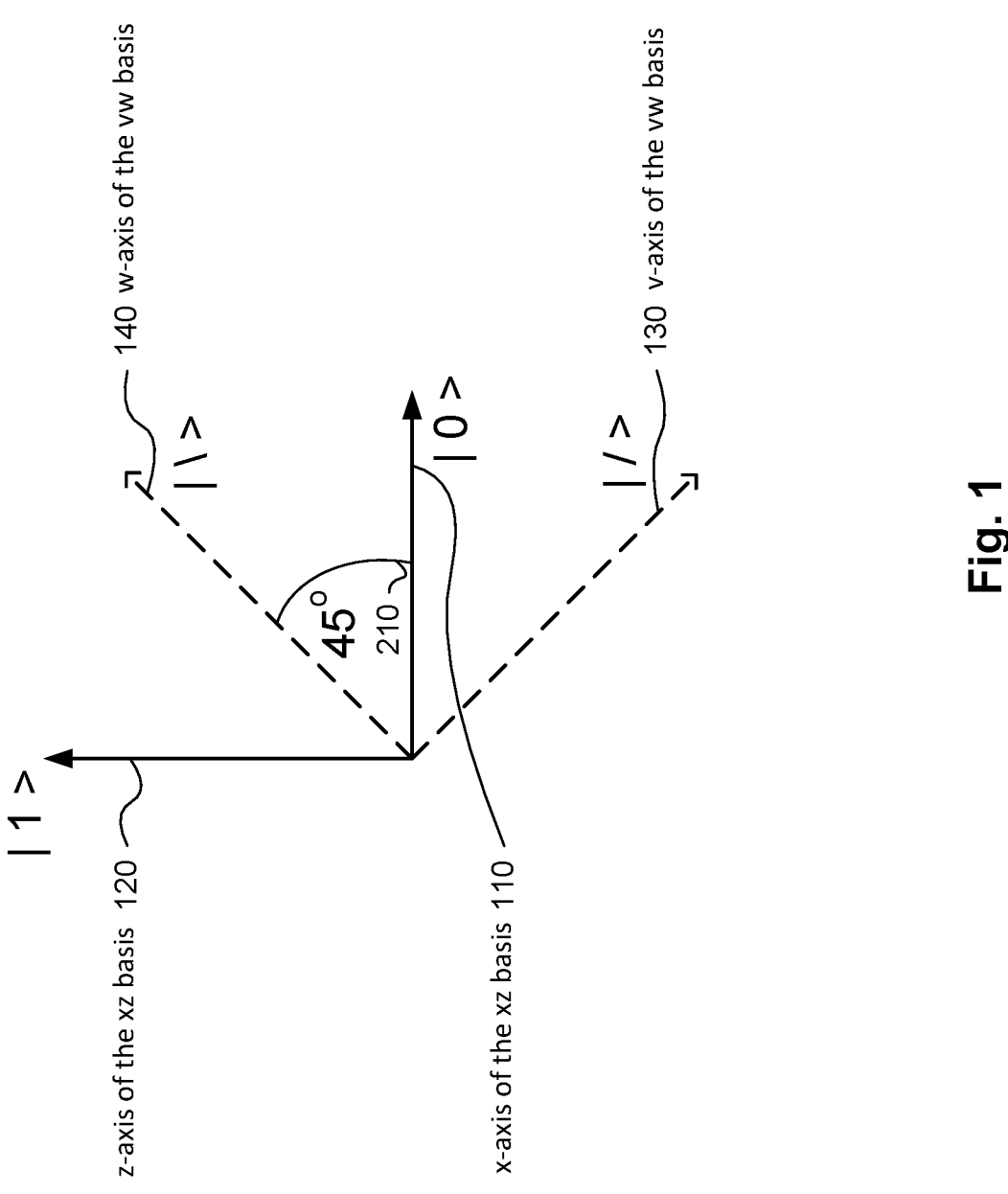
FIG. 1 illustrates two computational bases, according to embodiments.

FIG. 1 illustrates two computational bases, according to embodiments. A first computational basis has a computational basis state $|0\rangle$ along an x-axis 110, and a second computational basis state $|1\rangle$ along a z-axis 120. A second computational basis, having a third state $|/\rangle$ 130 and a fourth state $|\backslash\rangle$ 140. In an embodiment where each qubit is implemented as a photon with linear polarization, the first computational basis can represent the two options of having a photon polarized at 90° (vertically) or at 0° (horizontally), and the second computational basis can represent the two options of having a photon polarized at either 45° or −45° from a horizontal state. The states $|0\rangle$, $|1\rangle$, $|/\rangle$ and $|\backslash\rangle$ can respectively correspond to the x-axis, z-axis, v-axis and w-axis of FIG. 1. In an embodiment, such a system can be implemented on a network of mobile devices (e.g. user equipment UE) 255.

For representing any state of a single qubit, two states (e.g. $|0\rangle$ and $|1\rangle$) can be chosen to form a computational basis, and any other state can be represented as a super position of the two computational basis states. For example, the computational basis states can be:

$$|\psi_1\rangle = |0\rangle$$

$$|\psi_2\rangle = |1\rangle$$

Alternatively, each computational basis state can be represented as a vector:

$$|\psi_1\rangle = \begin{bmatrix} 1 \\ 0 \end{bmatrix}$$

$$|\psi_2\rangle = \begin{bmatrix} 0 \\ 1 \end{bmatrix}$$

A general state $|\Omega\rangle$ can be a superposition and represented with any of:

$$|\psi\rangle = \alpha|\psi_1\rangle + \beta|\psi_1\rangle$$

$$|\psi\rangle = \alpha|0\rangle + \beta|1\rangle$$

$$|\psi\rangle = \alpha\begin{bmatrix} 1 \\ 0 \end{bmatrix} + \beta\begin{bmatrix} 0 \\ 1 \end{bmatrix}$$

where each of $\alpha$ and $\beta$ can be a complex number. For a system of two qubits, there are four possibilities as to the state of the system and these can be represented as:

$$|00\rangle, |10\rangle, |01\rangle, \text{ and } |11\rangle$$

A qubit is said to be "measured" when its state is projected onto an axis of a computational basis such as the the xz-basis, producing an output of either $|0\rangle$ or $|1\rangle$. Alternatively, the state of a qubit can be measured along (projected onto) another computational basis, determined by states $|/\rangle$ and $|\backslash\rangle$. In the case of a photon, computational basis states $|0\rangle$ and $|1\rangle$ can respectively represent vertical and horizontal linear polarizations, and computational basis states $|/\rangle$ and $|\backslash\rangle$ can represent +45° and −45° linear polarizations (typically relative to horizontal linear polarization). In an embodiment, a receiver of a qubit can choose to make a measurement either with computational basis states $|0\rangle$ and $|1\rangle$, or with computational basis states $|/\rangle$ and $|\wedge\rangle$.

In an embodiment of a quantum key distribution protocol, an initial step can be for a quantum key distribution operator (O) to create a (n, 2) qubit system, where n is the key's length and 2 is the number of qubits. This system of 2 qubits can be prepared in the two-qubit state known as the Bell state, represented as:

$$|\psi\rangle = \frac{1}{\sqrt{2}}(|00\rangle + |11\rangle)$$

which indicates that upon a measurement of one qubit, i.e. qr_0, there is a 50% probability of it being in state $|0\rangle$ and a 50% probability of it being in state $|1\rangle$, and in either case, the second qubit will be in the same state $|0\rangle$ or $|1\rangle$. In other words, a state measurement of the two-qubit system can result in either state $|00\rangle$ or state $|11\rangle$ with equal probability.

Quantum entanglement is a physical phenomenon that occurs when a pair or a group of qubits, each of which can be a particle, is generated such that the quantum state of each qubit cannot be described independently. Instead, a quantum state must be described for the system as a whole. Using the Bell state as an example, if two qubits qr_0 and qr_1 are not entangled, measuring their states can result in four possibilities for their collective state: $|00\rangle$, $|01\rangle$, $|10\rangle$, $|11\rangle$, each having an equal measurement probability of ¼, as described above. However, if they are entangled, the possibilities are limited to $|00\rangle$, $|11\rangle$, each having an equal measurement probability of ½, and such is the case with the Bell state. To determine whether quantum states are entangled, a CHSH inequality (Clauser, Horne, Shimony, Holt) can be used.

Figure 2:
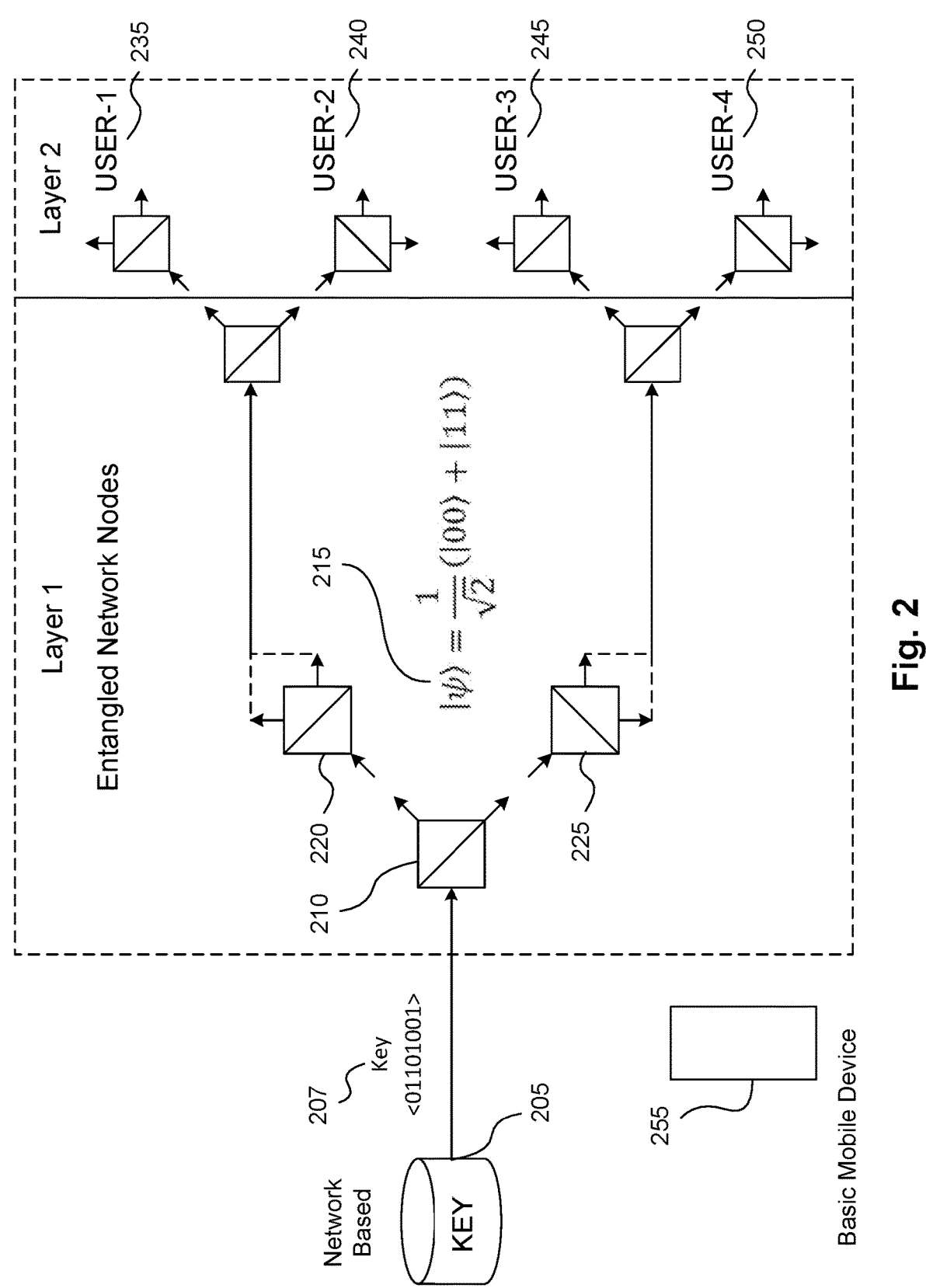
FIG. 2 illustrates an example implementation for distributing a quantum key, where the qubits are implemented as photons, a quantum key is a sequence of such photons, and quantum key distribution (QKD) is performed by sending sequences of photons to polarizing beam splitters, according to an embodiment.

FIG. 2 illustrates an implementation of a quantum key distribution scheme, according to an embodiment. A source of qubits 205, which can be a source of photons and be network based. An initial sequence of qubits can include a sequence of qubits that will form a quantum key 207. If the qubits are implemented as photons, they can be sent to a beam splitter 210, acting as an operator (O). From each photon, the beam splitter O 210 can create one entangled state of 2 qubits 215, sending one qubit qr_0 to a receiver A (Alice) 220, and the other qubit qr_1 to a receiver B (Bob) 225. If receivers Alice and Bob are also beam splitters themselves, they can repeat the process of creating further entangled states and distributing them to further users, such as USER-1 235, USER-2 104, USER-3 145, USER-4 150. Distribution from operator O to Alice and Bob can be referred to a Layer 1 distribution 255, and distribution from Alice and Bob to USER-1 235, USER-2 204, USER-3 245, and USER-4 250 can be referred to as a Layer 2 distribution. It should be appreciated that while an example is discussed using a beam splitter, as an alternative one can convert such entanglement between the polarization modes into entanglement between spatial modes, using a polarizing beam splitter. A beam splitter can also be a beam splitting device comprising a beam splitter, a processor, and memory.

In FIG. 2, each beam splitter can be configured to implement a quantum computing gate, or series of gates to incoming photons. But in embodiments where qubits are implemented otherwise than with photons, gates can be elements other than beam splitters.

Embodiments include methods for implementing gates to qubits, irrespective of how the qubits and gates are physically implemented, for distributing a quantum key to multiple users of a quantum communication channel.

Figure 3:
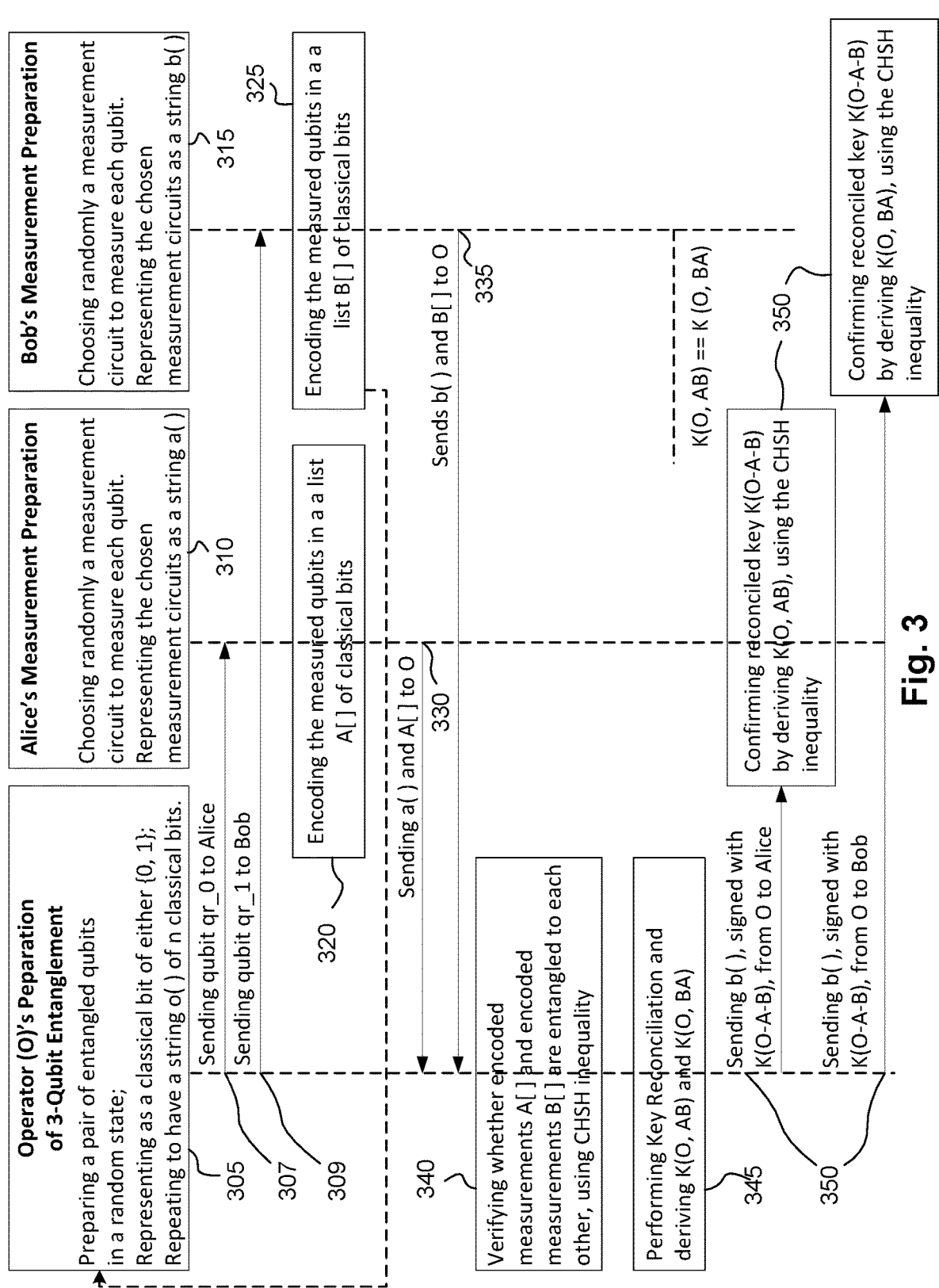
FIG. 3 illustrates a method of quantum key distribution, according to embodiments.

FIG. 3 illustrates a method of quantum key distribution, according to embodiments. An operator O can prepare a pair of entangled qubits, qr_0 and qr_1, the state (i.e. eigenstate) of which being randomly chosen between two possibilities $|00\rangle$ and $|11\rangle$. The choice can be stored as a classical bit of either 0 or 1 (i.e. {0,1}), and a plurality of entangled qubits can be prepared such as to have a sequence o( ) 305. The operator O can send qr_0 to Alice 307 and qr_1 to Bob 309. In an embodiment, a receiver A (Alice) can uniformly randomly choose one of two measurement circuits, to measure each qubit qr_0 along either $|0\rangle$ or $|1\rangle$ (respectively the x- and z-axes of FIG. 1) 310. If Alice receives a string of qubits. If receiving a string of qubits, Alice can represent the chosen measurement circuits as a string a( ) Similarly, a receiver B (Bob) can randomly choose a measurement circuit to measure each qubit qr_1 along either $|v\rangle$ or $|w\rangle$ (respectively the v-axis and w-axis of FIG. 1) 315, and represent the chosen measurement circuits as a string b( ) 315.

The receiver A (Alice), can encode each measured qubit qr_0 in a list A[ ] of classical bits 320, and Bob can similarly encode each measured qubit qr_1 in a list B[ ] 325. Then, Alice can send the list of measurement choices a( ) and the list of encoded measurements A[ ] to the operator O 330, and Bob can do similarly 335.

An operator O can verify, using Alice's list of measurement choices a( ) and Bob's list of measurement choices b( ) whether Alice's encoded measurements A[ ] are entangled to Bob's list of encoded measurements B[ ], by verifying a CHSH inequality 340. If sufficient entanglement is confirmed with a CHSH inequality, an operator O can perform key reconciliation and derive keys K(O, AB) and K(O, BA) 345. Subsequently, an operator O can send to Alice the string of measurement axes used by Bob, signed with the reconciled key K(O-A-B), and to Bob, the string of measurement axes used by Alice, signed with the reconciled key K(O-A-B) 350. Alice and Bob can then each confirm the reconciled key K(O-A-B) by respectively deriving K(O, AB) and K(O, BA) 355.

In an embodiment, a quantum key distribution system can have two channels: a quantum channel, as represented in FIG. 2, and a classical channel, which can be a conventional communication system, such as Fiber Optics Networks. Through the quantum channel, O can send a qubit qr_0 to receiver A (Alice) and a qubit qr_1, which is entangled to qubit qr_0, to receiver B (Bob). Both qubit qr_0 and qubit qr_1 can be prepared to be in an initial state $|0\rangle$, and both can be operated on by a single Pauli-X gate X, which can be represented as a matrix:

$$X = \begin{bmatrix} 0 & 1 \\ 1 & 0 \end{bmatrix}$$

In notation, qubit qr_0 can be in an initial state $|\Psi\rangle = |0\rangle$, and its preparation by an application of a Pauli-X gate H can be represented by:

$$|\psi\rangle = X|0\rangle$$

$$|\psi\rangle = \begin{bmatrix} 0 & 1 \\ 1 & 0 \end{bmatrix}\begin{bmatrix} 0 \\ 1 \end{bmatrix}$$

$$|\psi\rangle = \begin{bmatrix} 1 \\ 0 \end{bmatrix}$$

$$|\psi\rangle = |1\rangle$$

Similarly, qubit qr_1 can also be in an initial state $|\Psi\rangle = |0\rangle$, and be prepared by an application of a Pauli-X gate, resulting in a similar state:

$$|\psi\rangle = X|0\rangle$$

$$|\psi\rangle = \begin{bmatrix} 0 & 1 \\ 1 & 0 \end{bmatrix}\begin{bmatrix} 0 \\ 1 \end{bmatrix}$$

$$|\psi\rangle = \begin{bmatrix} 1 \\ 0 \end{bmatrix}$$

$$|\psi\rangle = |1\rangle$$

Once prepared as such, qubit qr_0 can be processed with a Hadamard gate H, which is represented by:

$$H = \frac{1}{\sqrt{2}}\begin{bmatrix} 1 & 1 \\ 1 & -1 \end{bmatrix}$$

Figure 4:
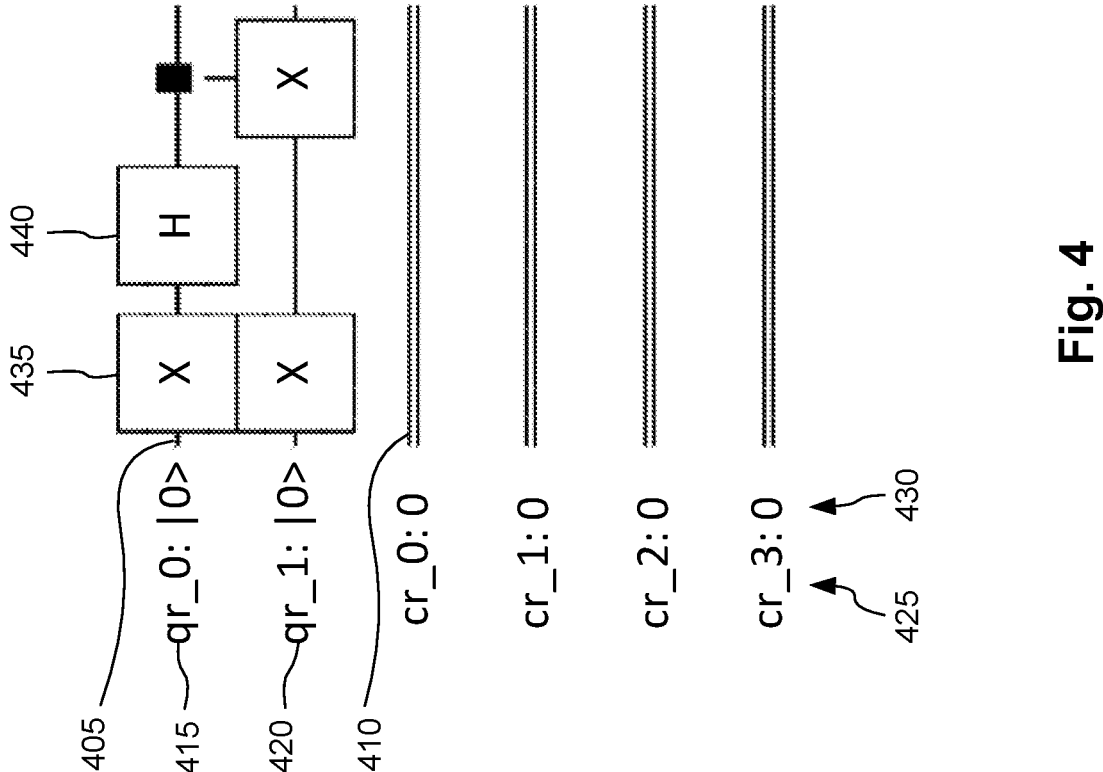
FIG. 4 is a quantum computing circuit representing the preparation of a Bell state, as used by an operator O, according to an embodiment.

FIG. 4 is a quantum computing circuit representing the preparation of a Bell state 215, in accordance with embodiments. Each horizontal single line 405 represents the evolution of a qubit in time, and each double line 410 line similarly represents the evolution of a classical bit. A first qubit is qr_0 415 and occupies the first single line. A second qubit is qr_1 420 and occupies the second single line. The double lines are occupied by classical bits cr_0, cr_1, cr_2, cr_3. Each line is preceded by an identification of the bit 425, and identification of the bit's initial state 430. A Pauli-X gate 435 is applied on each one of qubit qr_0 and qr_1, and then a Hadamard gate H 440 is applied on qubit qr_0. At this point, qubit qr_1 can be an input to the same Hadamard gate.

In an embodiment, once a Bell state has been prepared, operator O can send a first qubit qr_0 to receiver A (Alice) 207 through a quantum channel. Alice's reception can be referred to as Alice's Measurement Preparation 210.

In order to make a state measurement of qubit qr_0, receiver A (Alice) can alternatively prepare 310 any one of two measurement circuits, each one for measuring along a different computational basis: either $|0\rangle$ or $|1\rangle$. Referring to FIG. 1, one measurement circuit can be to measure qubit qr_0 along the x-axis (i.e. $|0\rangle$ ), and another measurement circuit can be to measure qubit qr_0 along the z-axis (i.e. $|1\rangle$ ). To obtain the mapping onto the z-axis, the quantum computing circuit of FIG. 5 can be used.

Figure 5:
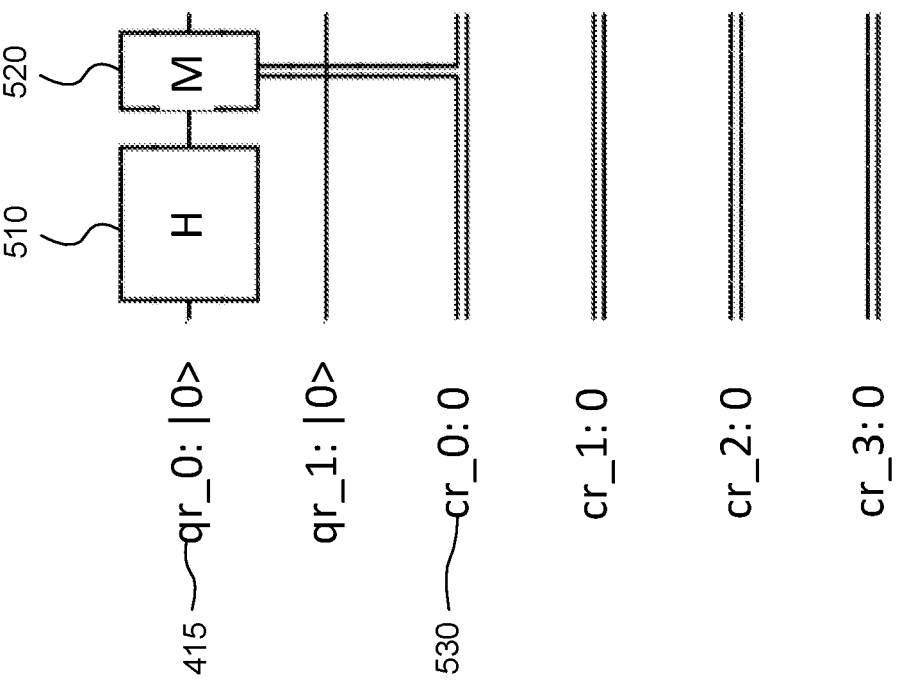
FIG. 5 illustrates a quantum computing circuit that can be prepared by receiver A (Alice), for measuring the state of qubit qr_0 along the z-axis (i.e. $|1\rangle$ ), according to embodiments.

FIG. 5 illustrates a quantum computing circuit that can be used by receiver A (Alice), for measuring the state of qubit qr_0 along the z-axis (i.e. $|1\rangle$ ). First, a Hadamard gate 510 can be applied to the qubit qr_0 415. Then, a state measurement 520 of qubit qr_0 415 can be made to classical bit cr_0 530.

At the site of the receiver A (Alice), Alice can alternatively use a measurement circuit for measuring qubit qr_0 along the x-axis (i.e. |0⟩ ). To do so, a single qubit qr_0 can be processed by a Pauli S-gate (i.e. a $\sqrt{Z}$-gate or "Z0.5" in some programming code), then a Hadamard gate, then a T-gate (i.e. a $\sqrt[4]{Z}$-gate or "Z0.25" in some code), and then another Hadamard gate. The sequence can be followed by a measurement 625 of qubit qr_0 to classical bit cr_0 530. The following are matrices corresponding to the S-gate and the T-gate:

$$S = \sqrt{Z} = \begin{bmatrix} 1 & 0 \\ 0 & i \end{bmatrix}$$

$$T = \sqrt[4]{Z} = \begin{bmatrix} 1 & 0 \\ 0 & e^{j\frac{\pi}{4}} \end{bmatrix}$$

Figure 6:
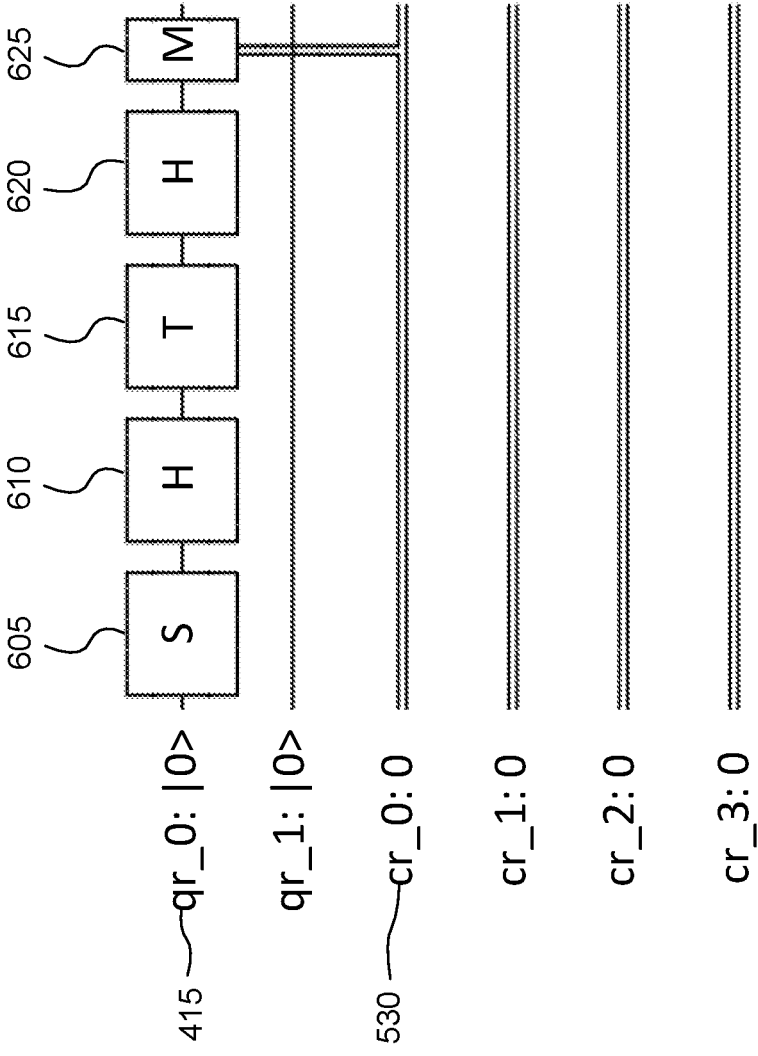
FIG. 6 illustrates a quantum computing circuit that can be prepared by receiver A (Alice), for measuring the state of qubit qr_0 along the x-axis (i.e. $|0\rangle$ ), according to embodiments.

FIG. 6 illustrates a quantum computing circuit that can be used by receiver A (Alice), for measuring the state of qubit qr_0 along the x-axis. To do so, a single qubit qr_0 can be operated on by a Pauli S-gate 605 (i.e. a $\sqrt{Z}$-gate or "Z0.5" in some code), then a Hadamard gate 610, then a T-gate (i.e. a $\sqrt[4]{Z}$-gate or "Z0.25" in some programming code) 615, and then another Hadamard gate 620. The sequence can be followed by a measurement 625 of qubit qr_0 415 to classical bit cr_0 530.

In an embodiment, once a Bell state has been prepared by an operator O, the operator O can send not only a sequence of qubits qr_0, each one entangled to a qubit qr_1, to receiver A (Alice) 307, but also a sequence of qubits qr_1 each one entangled to a qubit qr_0, to receiver B (Bob) 309, such that qubit qr_0 and qubit qr_1 are in a state of 2-qubit entanglement. Bob's reception can be referred to as Bob's Measurement Preparation 315. Like Alice, Bob can alternatively and randomly prepare any one of two measurement circuits, for measuring a qubit along respective ones of two computational bases. Referring to FIG. 1: one measurement circuit is for measuring along a v-axis (i.e. |/⟩ ), and the other is for measuring along an orthogonal w-axis (i.e. |\⟩ ). The vw-basis is tilted from a xz-basis by 45°.

Figure 7:
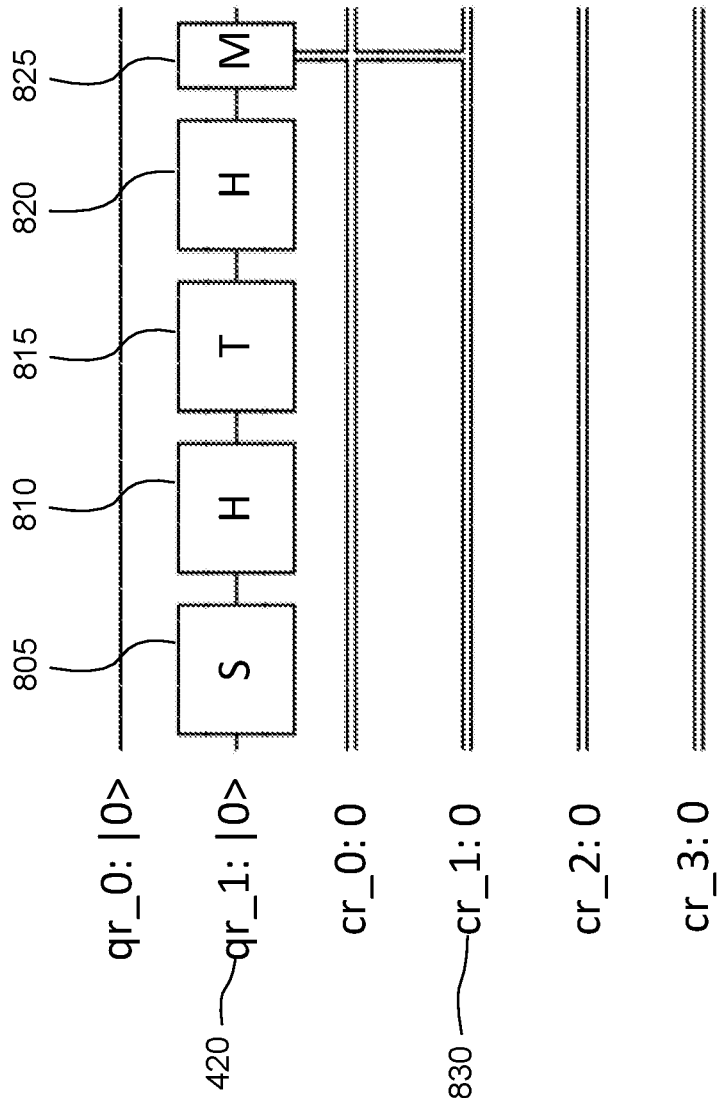
FIG. 7 illustrates a quantum computing circuit that can be used by receiver B (Bob), for measuring the state of qubit qr_1 along the w-axis (i.e. $|\backslash\rangle$ ) of a vw-basis, according to embodiments.

For mapping a state projection onto the w-axis (i.e. |\⟩ ) of the vw-basis, the quantum computing circuit of FIG. 7 can be used.

FIG. 7 illustrates a quantum computing circuit that can be used by receiver B (Bob), for measuring the state of qubit qr_1 along the w-axis (i.e. |\⟩ ) of a vw-basis. In this circuit, a series of gates are applied to qubit qr_1 in succession. First, a Pauli S gate 805 is applied, then a Hadamard gate 810. This is followed by a T gate 815, and another Hadamard gate 820. The sequence is followed by a measurement 825 of qubit qr_1 420 to classical bit cr_1 830.

Alternatively, Bob can also make a measurement along the v-axis (i.e. |/⟩ ) the vw-basis. The quantum computing circuit of FIG. 8 can be used for this purpose.

Figure 8:
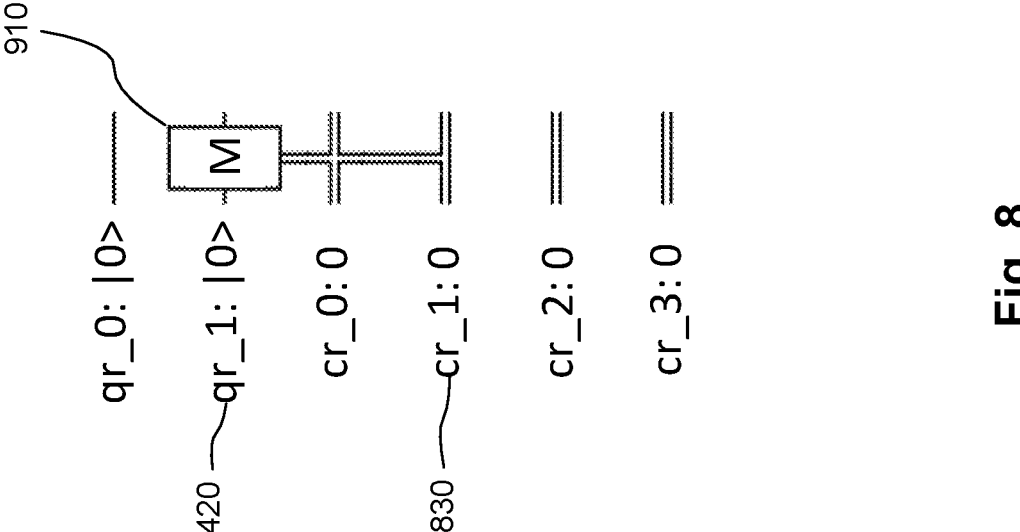
FIG. 8 illustrates a quantum computing circuit that can be used by receiver B (Bob), for measuring the state of a qubit qr_1 along the v axis (i.e. $|/\rangle$ ) of a vw-basis, according to embodiments.

FIG. 8 illustrates a quantum computing circuit that can be used by receiver B (Bob), for measuring the state of a qubit qr_1 along the v-axis of a vw-basis. The measurement 910 of qubit qr_1 420 can be made to classical bit cr_1 920.

In an embodiment, once Alice has made Measurement Preparations 310, Alice can measure and encode the received qubits as a key in classical bits 320, as either −1 or 1, i.e. {−1,1}, in response to each qubit measurement. Alice can generate the measured qubits as a list A[ ] and send it to an operator O 330.

Similarly, once Bob has made a Measurement Preparation 315, Bob can measure and encode the received qubits as a key in classical bits 325, as either −1 or 1, i.e. {−1,1}, in response to each qubit measurement. Bob can generate the measured qubits as a list B[ ] and send it to an operator O 335.

In an embodiment, the operator O can repeat the process of preparing 305 and sending two entangled qubits to Alice 307 and Bob 309 respectively. And Alice and Bob can keep receiving the qubits, making measurement preparations 310, 315, and encoding the qubits in classical bits 220, 225. The repetition causes two strings of qubits to be received respectively by Alice and Bob, each string representing a key, and because each qubit of one stream is entangled to a qubit of the other stream, Alice and Bob can be said to have the same key, in a perfect noiseless quantum channel transmission.

In an embodiment, when Alice and Bob have completed receiving and encoding their respective stream of n bits representing a key, they can send communicate to operator O, through authenticated classical channels, the corresponding streams of classical bits they have produced 320 325. Alice can therefore send a( ) and A[ ] to O 330, and Bob can send b( ) and B[ ] to O 335.

In an embodiment, when an operator O receives the encoded keys A[ ] and B[ ] through the classical channel, it can conduct a joint measurement of each pair of bits from A[ ] and B[ ], in order to verify whether 340 that the qubits it initially sent 305 307 and that were received by Alice 310 and Bob 315 were entangled 340. If the joint measurement of two bits is such that the CHSH inequality is violated, then entanglement between those two bits is confirmed. The CHSH inequality can be expressed as:

$$C = ||CHSH(A[], B[])|| < 2$$

In an embodiment, once quantum entanglement between each pair of bits has been verified with the CHSH inequality, a stream of bits can be made to include only those bits that were entangled. This can ensure that the bit streams from Alice and Bob are the same and include only bits that were entangled. Such a technique can be referred to as reconciliation 345, which can be defined as the technique needed to ensure that Alice's and Bob's key elements are equal.

To perform reconciliation, an operator O can send b( ) signed with K-O-A 350 to Alice, and it can send a( ) signed with K(O-A-B) 350 to Bob. Alice, who already has a( ) and A[ ], can use b( ) to calculate a key K(O, AB), and Bob, who already has b( ) and B [ ], can use a( ) to calculate a key K(O, BA). By using b( ) and a( ) to respectively derive K(O, AB) and K(O, BA), key distribution to Alice and Bob is complete. This last exchange can provide extra protection from an eavesdropper in the classical channel, however, in another embodiment, the operator O can send a common Key directly to Alice and Bob.

In an embodiment, Alice's measurements can be done along a xz-basis, and Bob's measurements can be done along a vw-basis, the axes of which are at 45° from the axes of the xz-basis. In a stream of entangled qubits there can be undesirable noise. In order to reduce the possibility of noise, a method as follows can be performed to generate uniformly distributed measurements.

In an embodiment, a method for generating uniformly distributed measurements and minimizing transmission noise, can begin with Alice randomly choosing a string of bits and preparing a list $\alpha( )$ in which each element $\alpha_i$ is either a bit 0 or a bit 1. This can be denoted as:

$$a(), a_i = \{0, 1\}$$

Then, Alice can randomly prepare a list $\sigma( )$ in which each eigenstate $o_i$ is either in the xz-basis: $\alpha(|0\rangle, |1\rangle)$ (as in FIG. 1), or in the vw-basis: $\beta(|/\rangle, |\backslash\rangle)$ (as in FIG. 1). This can be expressed as:

$$\sigma(), \sigma_i = \{a(|0\rangle, |1\rangle), \beta(|/\rangle, |\backslash\rangle)\}$$

where
  $\alpha$ is a complex number corresponding to the xz basis (i.e. $|0\rangle, |1\rangle$), or xz-plane of FIG. 1, and
  $\beta$ is a complex number corresponding to the vw basis (i.e. $|/\rangle, |\backslash\rangle$), or xz-plane of FIG. 1.
  If $\alpha_i=0$, then measurement can be performed along the $\alpha$ plane, and if $\alpha_i=1$, then measurement can be performed along the $\beta$ plane.
  Each measured result can be recorded in a list $A( )$ in which each element $A_i$ is either −1 or 1:

$$A(), A_i = \{-1, 1\}$$

Elements $\alpha_i$ and elements $\sigma_i$, respectively from list $\alpha( )$ and list $\sigma( )$ can be seen as components of corresponding vector $\alpha$ and vector $\sigma$. As such, the recording of the measured results in a list $A( )$ can be seen as a tensor operation between vector $\alpha$ and vector $\sigma$:

$$A = a \otimes \sigma$$

At Bob, similar measurements as those of Alice can be made. Bob can record measurements in a corresponding list $B( )$ in which each element $B_i$ is either −1 or 1:

$$B(), B_i = \{-1, 1\}$$

As with Alice, Bob's recordings can be represented with a tensor operation:

$$B = b \otimes \sigma$$

Figure 9:
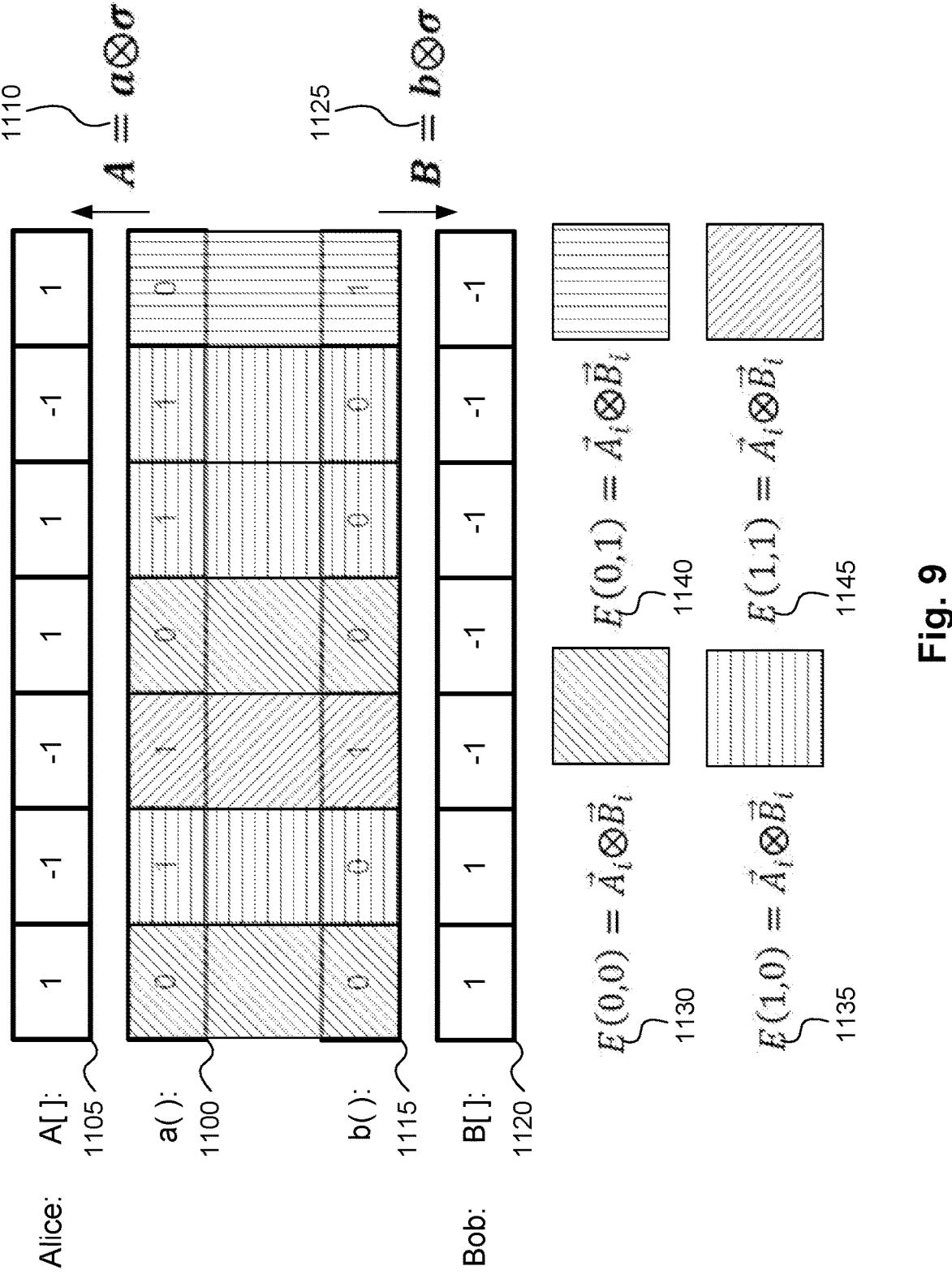
FIG. 9 illustrates two lists of bits as received by Alice and Bob, and respectively recorded by Alice and Bob, according to an embodiment.

FIG. 9 illustrate two lists of bits as received by Alice and Bob, and respectively recorded by Alice and Bob, according to an embodiment. Alice receives a string $\alpha( )$ 1100 of bits, each of which can be 0 or 1. Alice can record each bit in a list A[ ] 1105, according to tensor operation $A=\alpha \otimes \sigma$ 1110. Similarly, Bob can receive a string $b( )$ 1115 of bits, each of which can be 0 or 1, and record them in a list B[ ] 1120, according to tensor operation $B=b \otimes \sigma$ 1125.

Each bit received by Alice and Bob can either be 0 or 1, which makes for four (4) different possibilities: 00, 01, 10 and 11. To each of these possibilities, a tensor operation can be defined, where E is a record notation such that E(0,0) is calculated when $A_i$ is recorded on an $\alpha$-plane and $B_i$ is recorded on an $\alpha$-plane, E(1,0) is calculated when $A_i$ is recorded on a $\beta$-plane and $B_i$ is recorded on an $\alpha$-plane, E(0,1) is calculated when $A_i$ is recorded on an $\alpha$-plane and $B_i$ is recorded on a $\beta$-plane, and E(1,1) is calculated when $A_i$ is recorded on a $\beta$-plane and $B_i$ is recorded on a $\beta$-plane.

$$E(0, 0) = \vec{A}_i \otimes \vec{B}_i \qquad \text{1130}$$

$$E(1, 0) = \vec{A}_i \otimes \vec{B}_i \qquad \text{1135}$$

$$E(0, 1) = \vec{A}_i \otimes \vec{B}_i \qquad \text{1140}$$

$$E(1, 1) = \vec{A}_i \otimes \vec{B}_i \qquad \text{1145}$$

Once Alice and Bob have recorded their measurements in lists A[ ] 1105 and B[ ] 1120, an operator O can use A[ ] and B[ ], as well as a( ) and b( ) to calculate C, a CHSH correlation between any two bits having been received at the same time. The value of C for two strings (i.e. lists) of bits can be calculated with:

$$C = |E(0, 0) + E(0, 1)| + |E(1, 0) - E(1, 1)|$$

Under locality and realism theory, CHSH correlation is $C \leq 2$, while under non-locality theory, in which quantum entanglement is defined, $C \leq 2\sqrt{2}$. Therefore, if CHSH correlation is between 2 and $2\sqrt{2}$, it shows that the strings of bits are entangled, i.e. for two strings to be sufficiently entangled, C must be within the must be in the range $$2 < C \leq 2\sqrt{2}$$

In other words, such a value for C violates the Bell inequality, and confirms occurrence of quantum entanglement.

In an embodiment, if entanglement is not confirmed using a CHSH inequality, it can indicate excessive noise or interception, and communication can be aborted.

In an embodiment, if entanglement is confirmed 340, between a bit string sent to Alice, and a bit string sent to Bob, the operator O can conduct a key reconciliation 345. With the CHSH inequality, a key reconciliation can indicate that there is no eavesdropper interception during the transmission. Otherwise, O should abort the multi-user key distribution.

Figure 10:
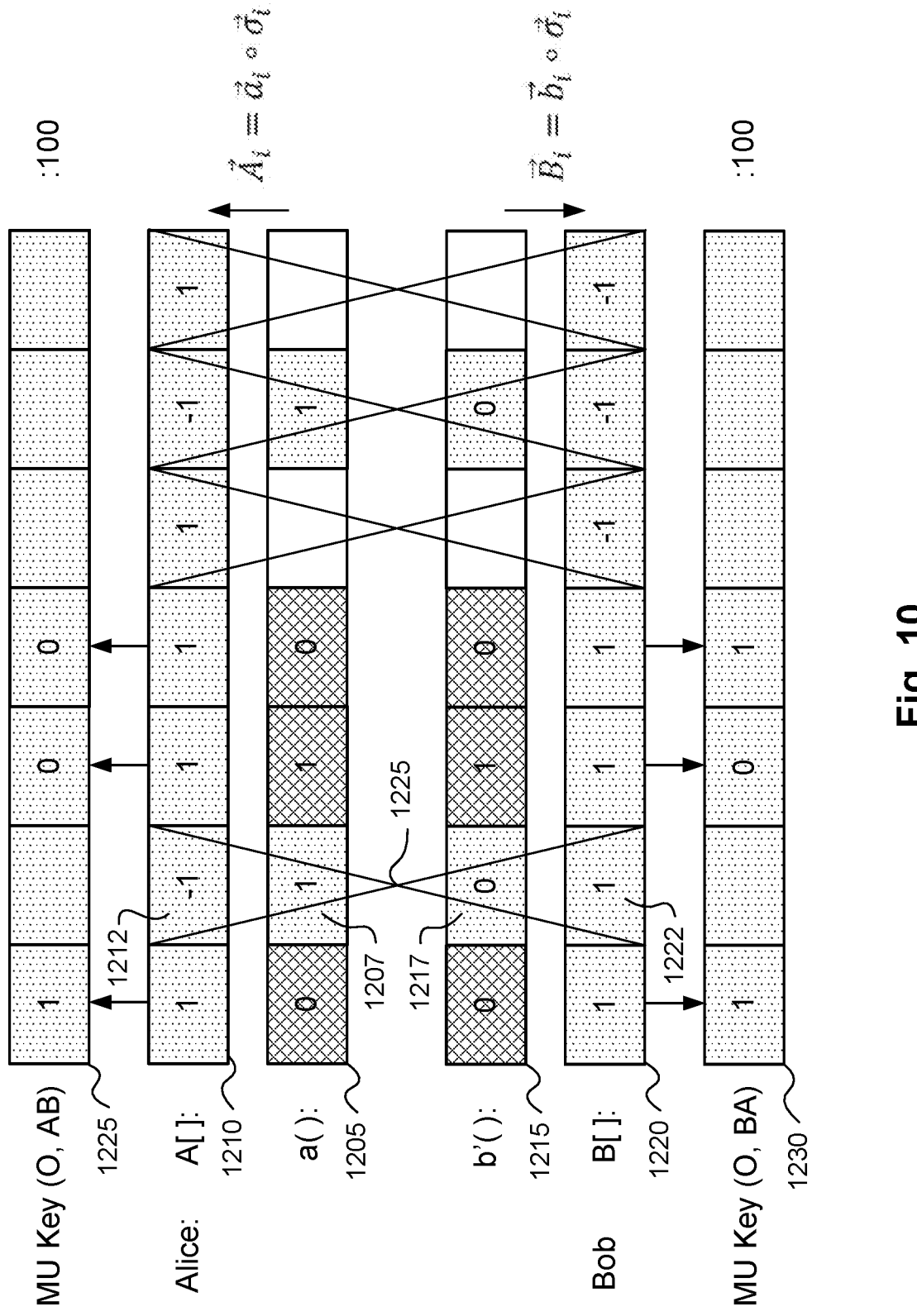
FIG. 10 illustrates strings of bits received and recorded by Alice and Bob, some of which are rejected because of a lack of entanglement, according to embodiments.

FIG. 10 illustrates strings of bits received and recorded by Alice and Bob, some of which are rejected because of a lack of entanglement, according to embodiments. From an operator O, Alice A can receive a string of qubits, each of which can be measured, such as to produce a string a( ) of classical bits 1205. Each bit of the string can be encoded, such as to produce a string A[ ] 1210. The same occurs at Bob, with a list of received qubits, entangled to qubits received by Alice and measured in a list of classical bits b( ) 1215, These are then encoded in a list B[ ] 1220.

In FIG. 10, the second bit of A[ ] 1212 is different than the second bit of B[ ] 1222. This indicates that the initial pair of qubits from which they were measured, measured as the second bit of a( ) 1207 and the second bit of b( ) 1217, were not entangled, and therefore they can be rejected 1225. Depending on a level of CHSH correlation between Alice's string and Bob's string, a certain number of bits can be rejected. The lesser the CHSH correlation, the greater the number of rejections, which would indicate either a high probability of interception, or too much noise. The non-rejected bits from list A[ ] forms Alice's key K(O, AB) 1225, and the non-rejected bits from list B[ ] forms Bob's key K(O, AB) 1230. If they are the same, they form the desired quantum key K(O-A-B).

Figure 11:
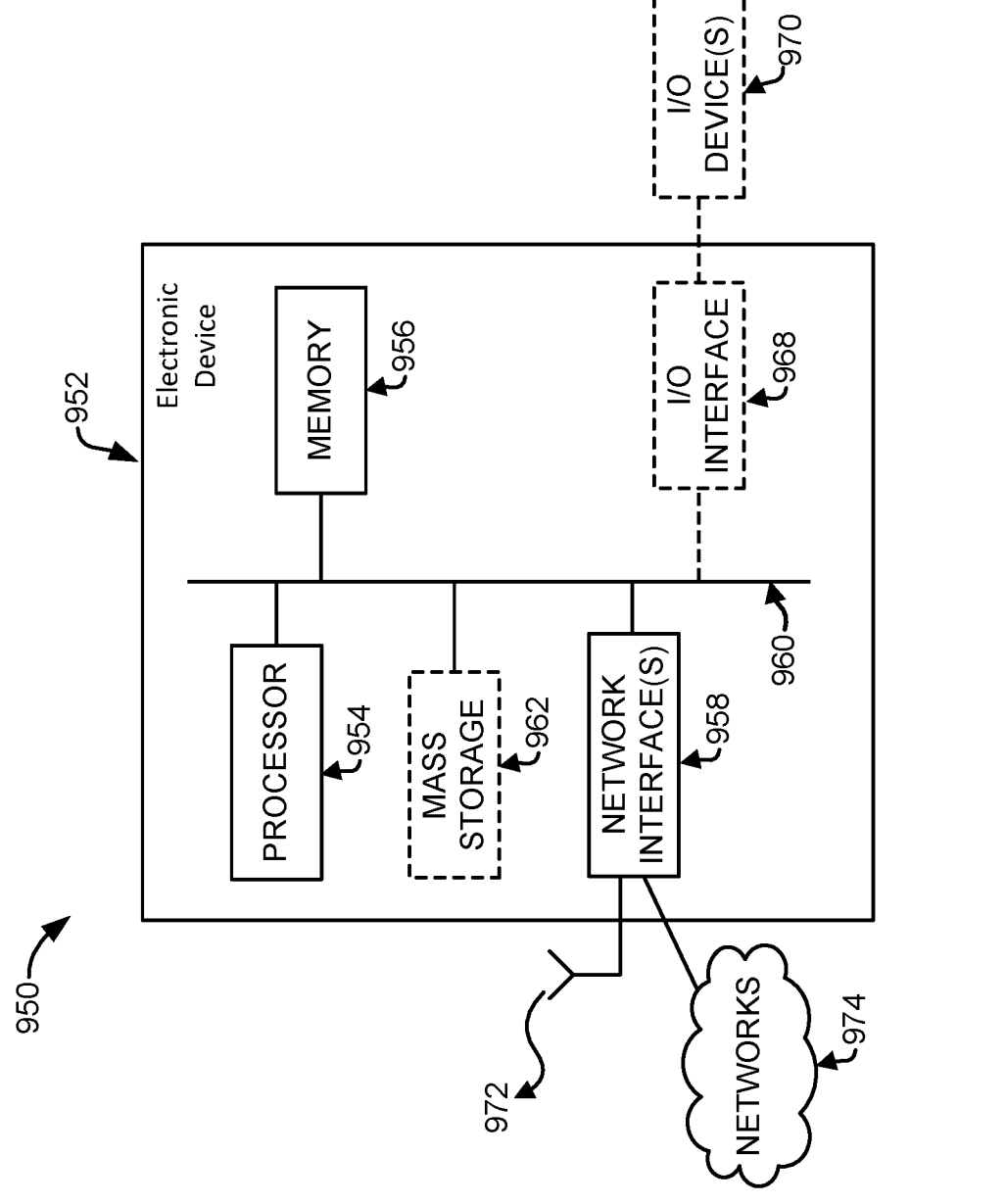
FIG. 11 is a block diagram of an electronic device 952 within a computing and communications environment 950 that may be used for implementing devices and methods in accordance with representative embodiments of the present disclosure, according to embodiments.

FIG. 11 is a block diagram of an electronic device (ED) 952 illustrated within a computing and communications environment 950 that may be used for implementing the devices and methods disclosed herein. The electronic device 952 typically includes a processor 954, such as a central processing unit (CPU), and may further include specialized processors such as a graphics processing unit (GPU) or other such processor, a memory 956, a network interface 958 and a bus 960 to connect the components of ED 952. ED 952 may optionally also include components such as a mass storage device 962, a video adapter 964, and an I/O interface 968 (shown in dashed lines). In embodiments, an electronic device can be part of operator O, an electronic device can be part of receiver A (Alice), and an electronic device can be part of receiver B (Bob). In some embodiment, an electronic device part of receiver A (Alice) can be connected to an electronic device part of operator O and include a classical communication channel. In some embodiment, an electronic device part of receiver B (Bob) can be connected to an electronic device part of operator O and include a classical communication channel.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for an operator O to generate and distribute a multi-user shared key to a receiver A and to a receiver B, comprising:

preparing pairs of entangled qubits in sequence, each pair of entangled qubits in a state of 2-qubit entanglement;

sending from each pair of entangled qubits, one entangled qubit to a receiver A and the other entangled qubit to a receiver B;

receiving a reply from each of receiver A and receiver B;

sending the multi-user shared key to each of receiver A and receiver B, wherein sending the multi-user shared key to each of receiver A and receiver B comprises:

sending to receiver A, a list of encoded bits from receiver B, for deriving a key according to receiver A's list of measured bits, and receiver A's list of encoded bits;

sending to receiver B, a list of encoded bits from receiver A, for deriving a key according to receiver B's list of measured bits, and receiver B's list of encoded bits;

receiving, through respective authenticated classical channels receiver A's derived key and receiver B's derived key; and performing quantum correlation between receiver A's derived key and receiver B's derived key using an entanglement inequality, wherein deriving a key comprises rejecting pairs of bits that were not entangled according to the entanglement inequality;

using a derived key as a reconciled key, if entanglement between receiver A's derived key and receiver B's derived key is sufficient to ensure security.

2. The method of claim 1, wherein receiving the reply from each of receiver A and receiver B comprises:

receiving the list of encoded bits from receiver A, each bit having been measured from a qubit sent by operator O, recorded in the receiver A's list of measured bits, and encoded in the list of encoded bits from receiver A; and receiving the list of encoded bits from receiver B, each bit having been measured from a qubit sent by operator O, recorded in the receiver B's list of measured bits, and encoded in the list of encoded bits from receiver B.

3. The method of claim 1, wherein sending the key to each of receiver A and receiver B further comprises:

verifying the correlation between the list of encoded bits from receiver A, and the list of encoded bits from receiver B;

wherein verifying the correlation is performed using a quantum entanglement inequality.

4. The method of claim 3 wherein the quantum entanglement inequality is the Clauser, Horne, Shimony, Holt (CHSH) inequality.

5. The method of claim 1, further comprising a layer 2 iteration wherein operator O of claim 1 is substituted by receiver A of claim 1, receiver A of claim 1 is substituted by a USER-1, receiver B of claim 1 is substituted by a USER-2.

6. The method of claim 1, further comprising a layer 2 iteration wherein operator O of claim 1 is substituted by receiver B of claim 1, receiver A of claim 1 is substituted by a USER-3, receiver B of claim 1 is substituted by a USER-4.

7. A method for an operator O to generate and distribute a multi-user shared key to a receiver A and to a receiver B, comprising:

preparing pairs of entangled qubits in sequence, each pair of entangled qubits in a state of 2-qubit entanglement;

sending from each pair of entangled qubits, one entangled qubit to a receiver A and the other entangled qubit to a receiver B;

receiving a reply from each of receiver A and receiver B;

sending the multi-user shared key to each of receiver A and receiver B, wherein sending the multi-user shared key to each of receiver A and receiver B comprises:

sending to receiver A, a list of encoded bits from receiver B, for deriving a key according to receiver A's list of measured bits, and receiver A's list of encoded bits;

sending to receiver B, a list of encoded bits from receiver A, for deriving a key according to receiver B's list of measured bits, and receiver B's list of encoded bits;

receiving, through respective authenticated classical channels-receiver A's derived key and receiver B's derived key; and performing quantum correlation between receiver A's derived key and receiver B's derived key using an entanglement inequality, wherein deriving a key comprises rejecting pairs of bits that were not entangled according to the entanglement inequality;

discarding a derived key and aborting communication, if entanglement between receiver A's derived key and receiver B's derived key is insufficient to ensure security.

8. The method of claim 7, wherein receiving the reply from each of receiver A and receiver B comprises:

receiving the list of encoded bits from receiver A, each bit having been measured from a qubit sent by operator O, recorded in the receiver A's list of measured bits, and encoded in the list of encoded bits from receiver A; and receiving the list of encoded bits from receiver B, each bit having been measured from a qubit sent by operator O, recorded in the receiver B's list of measured bits, and encoded in the list of encoded bits from receiver B.

9. The method of claim 7, wherein sending the key to each of receiver A and receiver B further comprises:

verifying the correlation between the list of encoded bits from receiver A, and the list of encoded bits from receiver B;

wherein verifying the correlation is performed using a quantum entanglement inequality.

10. The method of claim 9, wherein the quantum entanglement inequality is the Clauser, Horne, Shimony, Holt (CHSH) inequality.

11. The method of claim 7, further comprising a layer 2 iteration wherein operator O of claim 7 is substituted by receiver A of claim 7, receiver A of claim 7 is substituted by a USER-1, receiver B of claim 7 is substituted by a USER-2.

12. The method of claim 7, further comprising a layer 2 iteration wherein operator O of claim 7 is substituted by receiver B of claim 7, receiver A of claim 7 is substituted by a USER-3, receiver B of claim 7 is substituted by a USER-4.

\*　\*　\*　\*　\*